United States Patent Office 3,336,058
Patented Aug. 15, 1967

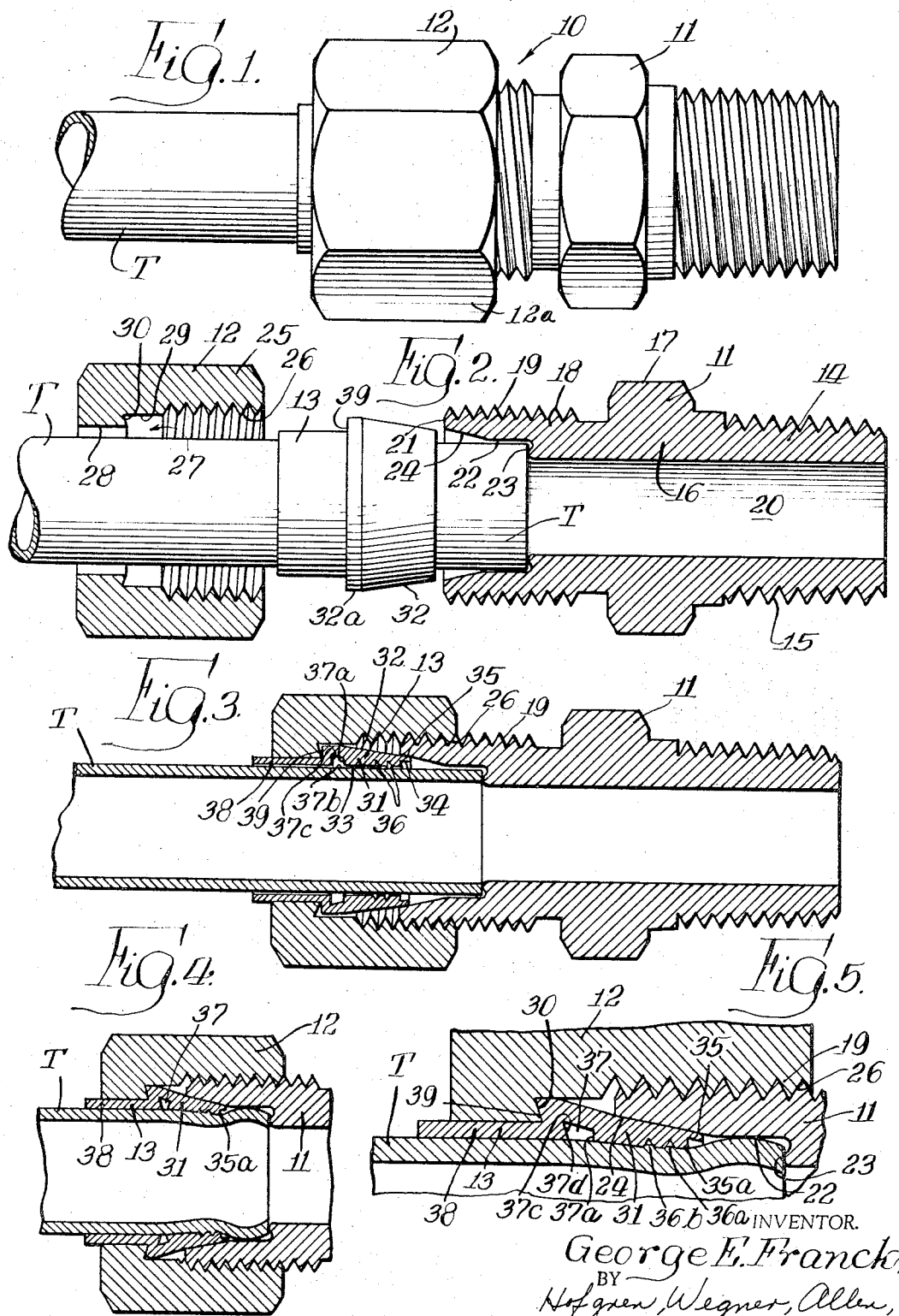

3,336,058
THERMAL SHOCK RESISTANT FITTING
George E. Franck, Morton Grove, Ill., assignor to Imperial-Eastman Corporation, a corporation of Illinois
Filed Aug. 27, 1964, Ser. No. 392,396
5 Claims. (Cl. 285—341)

This invention relates to fittings and in particular to fittings for coupling metal tubing.

In certain installations, tubings and the fittings connected thereto are subjected to a sudden large temperature variation which in the conventional fittings has been found to tend to destroy the sealed connection of the tubing thereto. Illustratively, in certain installations the tubing and fittings may be disposed in an ambient atmosphere wherein the temperature may be sub-zero. Introduction of high temperature steam or the like through the tubing and fitting under such ambient conditions substantially instantaneously heats the tubing and fitting to a temperature approximating that of the steam or liquid, which temperature may be up to approximately 100° F. Similarly, where the system is installed in an ambient atmosphere which may be at a relatively low temperature such as below freezing, the cooling of the fitting after the hot liquid flow is discontinued thereto occurs relatively quickly. Such sudden changes in the temperature of the fitting elements produces a thermal shock therein which tends to loosen the conventional fittings of the art permitting a break in the sealed connection of the fitting to the coupling.

The present invention comprehends an improved fitting which eliminates the above discussed disadvantages of the known fittings and which provides an improved positive coupling of the fitting to the tubing in a novel and simple manner.

Thus, a principal object of the present invention is the provision of a new and improved fitting.

Another object of the invention is the provision of such a fitting having new and improved means for precluding loosening of the fitting as a result of thermal shock therein.

A further object of the invention is the provision of such a fitting having new and improved sleeve structure adapted to maintain a sealed connection to the tubing notwithstanding the subjection thereof to thermal shock-producing conditions.

Still another object of the invention is the provision of such a fitting wherein the sleeve is arranged to function somewhat in the manner of a spring member to absorb thermal shock forces without undesirable loosening of the fitting as a result thereof.

A yet further object of the invention is the provision of such a fitting including a body member having an inner connecting porton and a bore having an inner end opening through the connecting portion, the inner bore end including an outer cylindrical portion having a diameter slightly larger than the diameter of the tube to be coupled, an annular shoulder at the outer end of the cylindrical portion, and an inner portion widening axially inwardly from the cylindrical portion, a nut member having an outer portion adjustably connected to the body member, and a bore coaxially aligned with the body member bore and including an outer cylindrical portion, an inner cylindrical portion, and an annular shoulder between the inner and outer portions of the nut member bore, and a sleeve member having an outer portion defined by an axially inwardly narrowing, outer cam surface, a cylindrical inner surface having a diameter closely similar to the outer diameter of the tube to be coupled, a radially inwardly opening, annular groove in the sleeve outer portion adjacent the axially inner end thereof, the sleeve member further having an axially inner portion defined by a cylindrical inner surface having a diameter closely similar to the outer diameter of the tube to be coupled, and an annular shoulder between the outer and inner portions of the sleeve coaxially aligned with and confronting the annular shoulder of the nut member.

Yet another object of the invention is the provision of such a fitting wherein the sleeve is further arranged to support the tube against substantial vibration therein.

Still another object of the invention is the provision of such a fitting arranged to permit make-up of the fitting with effectively minimum torque.

Other objects and advantages of the invention will be apparent from the following description taken in connection with the accompanying drawing wherein:

FIGURE 1 is a side elevation of a fitting embodying the invention having a portion of a tube end connected thereto;

FIGURE 2 is a diametric section thereof with the parts as arranged prior to the make-up of the fitting;

FIGURE 3 is a diametric section thereof with the parts as arranged upon completion of the make-up of the fitting;

FIGURE 4 is a fragmentary enlarged diametric section illustrating in greater detail the arrangement of the sleeve in the nut and body members in the made-up arrangement of the fitting; and FIGURE 5 is an enlarged fragmentary diametric section thereof illustrating the arrangement of the sleeve in the nut and body members in further detail.

In the exemplary embodiment of the invention as disclosed in the drawing, a fitting generally designated 10 is shown to comprise a body member 11, a nut member 12, and a sleeve member 13 cooperating in the made-up arrangement of the fitting as illustrated in FIGURE 3 to couple a tube T in sealed connected relationship therewith. As best seen in FIGURE 5, the sleeve 13 is arranged in the made-up condition of the fitting to grip the tube T tightly while providing a resiliently flexible connection between the body member and nut member to provide an improved sealed connection of the tube to the body member, while yet effectively precluding loosening of the fitting as from thermal shock conditions.

More specifically, body member 11 includes an outer portion 14 having an external thread 15 for connection to an element to which the fitting is to be connected (not shown). The fitting further includes a mid-portion 16 provided externally with a plurality of flats 17 as for engagement by a conventional tool, such as a wrench, for use in holding the body member during the make-up of the fitting. The body member still further includes an inner portion 18 having an external thread 19. Extending coaxially through the body member is a bore 20 which opens at its inner end to a radial face 21 defining the inner end of the body member. The portion of the bore 20 adjacent the end face 21 is defined by a cylindrical portion 22 having a diameter slightly larger than the outside diameter of the tubing T. At the outer end of the cylindrical portion 22, the bore is defined by an undercut annular shoulder 23 defining an axially inwardly narrowing, flared surface. At the inner end of the cylindrical portion 22 the bore is defined by an axially inwardly widening frusto-conical surface 24.

The nut member 12 includes an outer portion 25 provided with an internal thread 26 arranged to have threaded engagement with thread 19 of the body member for moving the nut member onto and from the body member as a result of threaded rotation therebetween. The thread 26 defines the outer portion of a bore 27 within the nut member which includes an inner cylindrical portion 28 and a cylindrical portion 29 having a diameter larger than the diameter of portion 28 and disposed between the cylindrical portion 28 and the thread 26. Between cylindrical portions 28 and 29 of the nut member bore, the nut member is provided with an annular, axially inwardly narrowing, flared shoulder 30. As best seen in FIGURE 1, the nut member may be provided externally with a plurality of flats 12a for engagement by a suitable conventional tool, such as a wrench, for use in make-up of the fitting.

As indicated briefly above, the fitting 10 further includes a sleeve 13 which functions, in the made-up arrangement of the fitting, to sealingly connect the tube to the body member and lock the nut member against loosening as from thermal shock conditions existing within the fitting. As best seen in FIGURE 3, the sleeve member 13 includes an outer portion 31 defined by an axially inwardly narrowing, frusto-conical, outer cam surface 32 and a cylindrical inner surface 33. The diameter of cylindrical surface 33 is closely similar to the outer diameter of the tube T. The outer end of the sleeve is provided with an axially outwardly and radially inwardly opening recess 34 leaving a thin deflectable tip portion 35 radially outwardly thereof. The sleeve outer portion 31 is further provided with a plurality, herein two, of radially inwardly opening annular grooves 36, preferably V-shaped and having a frusto-conical outer surface 36a and a radial inner surface 36b. Inwardly of the grooves 36 the sleeve portion 31 is further provided with an enlarged radially inwardly opening annular groove 37 which, as shown in FIGURE 3, includes a radial outer wall surface 37a, an inwardly widening frusto-conical bottom surface 37b, and a radial inner surface 37c. At the axially inner end of the cam surface 32, the sleeve is defined exteriorly by a cylindrical surface 32a which has an outer diameter which is slightly smaller than the diameter of the nut surface 29.

The sleeve 13 further includes a thin walled inner end portion 38 having an inner diameter closely similar to the outer diameter of the tube T. Between inner portion 38 and outer portion 31, the sleeve is externally defined by a radial shoulder 39 which is coaxially aligned with and confronts the annular shoulder 30 of the nut member 12.

In one form of fitting 10 embodying the invention such as for use with a ⅜ inch tube, the I.D. of the sleeve may be approximately .38 inch, the diameter of surface 32a may be approximately .49 inch, the length of surface 34 may be approximately .028 inch, the angular surface 36a of the grooves 36 may extend at an angle of 30 degrees to a radial plane, the cam surface 32 may extend at an angle of approximately 8 degrees to the axis of the sleeve, the surface 37b of the groove 37 may extend at an angle of approximately 15 degrees to the axis of the sleeve, and the groove 37 may be approximately .04 inch wide. The angle of nut member surface 30 may be approximately 15 degrees to a radial plane.

As illustrated in FIGURE 2, the fitting 10 is assembled by firstly installing the nut member 12 over the end of the tube T, installing the sleeve member 13 over the end of the tube, and then inserting the end of the tube into the bore portions 24 and 22 of the nut member 12, until the end of the tube abuts the surface 23. In the next stage of assembly as illustrated in FIGURE 3, the nut member is advanced toward the body member to engage the thread 26 of the nut member with the thread 19 of the body member. The nut member may be threaded onto the body member as by fingertip manipulation until the surface 30 thereof engages the surface 39 of the sleeve to urge the tip portion 35 of the sleeve into engagement with the body bore surface 24.

Further advance of the nut member 12 onto the body member may now be effected by the application of suitable tools to the surfaces 11 and 12 providing a torquing of the nut member to force the sleeve from the position of FIGURE 3 to the position of FIGURE 4 wherein the fitting is completely made-up. The functioning of the sleeve in constrictively sealingly engaging the tube T during the make-up of the fitting is best seen by reference to FIGURES 3 and 5. Thus, as the nut member 12 is advanced (or moved to the right as seen in these figures) the surface 30 forces the surface 39 of the sleeve to the right against the resistance to movement afforded by engagement of the tip portion 35 with the body member surface 24. The sleeve surface 32 moves downwardly into the frusto-conical bore surface 24 with the tip portion 35 being deflected inwardly and the tube T being deformed radially inwardly as shown in FIGURE 5. As illustrated in FIGURE 5, the portion of the metal defining the outer surface of the tube T is pressed upwardly into the grooves 36 during the make-up of the fitting. Thus, the tube is locked positively against axial movement in the sleeve. Further, the tip 35a of the sleeve at the radially inner end of the recess 35 bites into the tube surface further precluding axial movement of the tube. The tip 37d of the groove 37 functions similarly to tip 35a of recess 35 to engage the tube and prevent axial movement thereof from the fitting.

During the make-up of the fitting, the groove 37 is deformed so as to bring the inner wall 37c from its original radial configuration to a frusto-conical inwardly widening configuration and bring the outer wall 37a from its original radial configuration to a frusto-conical axially outwardly widening configuration. By virtue of this change in the configuration of the groove 37, this portion of the sleeve provides a resilient springlike action in connecting the portion of the sleeve disposed between the body member and the tube to the portion of the sleeve disposed between the nut member and the tube. This spring action provides a high resistance to loosening of the fitting as from thermal shock and similar conditions.

Thus, for example, where the fitting cools rapidly from a high temperature such as 450° F. to a relatively low temperature such as 0° F., the sleeve member, being a relatively thin member, cools more rapidly than the nut and body members, and would, therefore, ordinarily tend to shrink away from the nut and body members, thereby loosening the fitting. However, because of the resilient nature of the sleeve as afforded by the groove 37 construction, the two ends of the sleeve portion 31 are retained in sealed engagement with the body member surface 24 and nut member surface 29, respectively. Still further, the cylindrical surface 32a tends to lock the nut against rotation relative to the sleeve, thereby further assuring a positive maintained assembly of the fitting at all times. Still further, the groove 37 provides a thermal barrier in the sleeve tending to prevent heat transfer between the portion of the sleeve adjacent surface 32a and the tube, thereby further resisting undesirable differences in the contraction and expansion of the sleeve and nut members, respectively. In addition, the action of the shoulder 30 against the sleeve shoulder 39 causes the inner portion 38 of the sleeve to be pressed firmly down against the tube, whereby the sleeve portion 38 hugs the tube to support it firmly against vibrations.

The outer end of the tube which engages the body member surface 23 is caused to fold outwardly into engagement with the cylindrical surface 22 of the body member bore. Thus, the outer end of the tube is securely retained in axial relationship with the bore and against withdrawal from the fitting by virtue of the introduced interference between the folded end of the tube and the tip 35a of the sleeve.

The tube T is sealingly connected to the body member 11 by virtue of the constricted fit of the sleeve portion 31 between the body member surface 24 and the outer wall of the tube. The sleeve has at least six points of resistance to withdrawal of the tube, namely at tip 35a, each of the grooves 36, the tip 37d of the groove 37, and the gripping engagement of the inner portion 31 of the sleeve with the tube wall as well as the gripping engagement of the inner portion 38 of the sleeve with the tube wall. Thus, the fitting is arranged for improved positive retention of the tube end in connected association therewith notwithstanding substantial vibration, thermal shock, and similar forces tending to urge the tube outwardly from the fitting.

The fitting elements are simple and economical of manufacture being formed preferably of suitable metal, such as brass, steel, etc. Where corrosion problems exist, of course, the metals may be suitably selected for resistance thereto. The make-up of the fitting is extremely simple. The part requirements in making up the fitting are relatively low by virtue of the improved structure, thereby further facilitating the assembly or make-up of the fitting.

While I have shown and described one embodiment of my invention, it is to be understood that it is capable of many modifications. Changes, therefore, in the construction and arrangement may be made without departing from the spirit and scope of the invention as defined in the appended claims.

I claim:
1. A fitting for coupling a tube, comprising: a body member having an axially inner connecting portion and a bore having an axially inner end opening through said connecting portion, said inner bore end including a radially outer cylindrical portion having a diameter slightly larger than the diameter of the tube to be coupled, an annular shoulder at the axially outer end of said cylindrical portion, and an axially inner portion radially widening axially inwardly from said cylindrical portion; a nut member having an axially outer portion adjustably connected to said body member, and a bore coaxially aligned with said body member bore and including an axially outer cylindrical portion, an axially inner cylindrical portion and an axially inwardly, radially widening flared shoulder between said inner and outer portions of the nut member bore; and a sleeve member having an axially outer portion defined by an axially outwardly narrowing outer cam surface, a cylindrical radially inner surface having a diameter closely similar to the outer diameter of the tube to be coupled, a radially inwardly opening, annular groove in said sleeve outer portion adjacent the axially inner ends thereof, said sleeve member further having an axially inner portion defined by a radially outer annular surface coaxially within said inner cylindrical portion of the nut member bore, a cylindrical radially inner surface having a diameter closely similar to the outer diameter of the tube to be coupled and an annular shoulder between said outer and inner portions of the sleeve coaxially aligned with and confronting said annular shoulder of the nut member and extending at an angle of at least approximately 90° to the axially outward extension of the longitudinal axis of the sleeve, the diameter of the sleeve member at said annular shoulder being at least only slightly smaller than the diameter of said axially outer cylindrical portion of the nut member bore.

2. The fitting of claim 1 wherein said annular groove is defined by radial inner and outer side walls and a frusto-conical inwardly widening bottom wall.

3. The fitting of claim 1 wherein said sleeve shoulder is radial.

4. The fitting of claim 1 wherein the axially inner end of said sleeve groove comprises an axially inwardly widening flared surface.

5. The fitting of claim 1 wherein the axially inner end of said groove comprises an axially inwardly widening frusto-conical surface and said nut member shoulder comprises an axially inwardly widening frusto-conical surface substantially parallel to said inner end surface of the groove.

References Cited

UNITED STATES PATENTS

| 1,804,814 | 5/1931 | Schultis | 285—341 X |
| 2,545,930 | 3/1951 | Richardson | 285—382.7 X |
| 3,201,153 | 8/1965 | Currie | 285—382.7 X |

FOREIGN PATENTS

| 1,224,852 | 2/1960 | France. |
| 834,626 | 3/1952 | Germany. |
| 745,973 | 3/1956 | Great Britain. |
| 749,395 | 5/1956 | Great Britain. |
| 836,002 | 6/1960 | Great Britain. |
| 852,259 | 10/1960 | Great Britain. |

CARL W. TOMLIN, *Primary Examiner.*

THOMAS F. CALLAGHAN, *Examiner.*